United States Patent
El-Damhougy et al.

(10) Patent No.: US 10,142,013 B2
(45) Date of Patent: Nov. 27, 2018

(54) METHOD OF OPTIMIZING AN INTERPLANETARY COMMUNICATIONS NETWORK

(75) Inventors: Hesham El-Damhougy, Tustin, CA (US); Keith Jarett, Lafayette, CA (US)

(73) Assignee: The Boeing Company, Chicago, IL (US)

( * ) Notice: Subject to any disclaimer, the term of this patent is extended or adjusted under 35 U.S.C. 154(b) by 2552 days.

(21) Appl. No.: 11/749,172

(22) Filed: May 16, 2007

(65) Prior Publication Data
US 2008/0155070 A1 Jun. 26, 2008

Related U.S. Application Data

(63) Continuation-in-part of application No. 11/613,839, filed on Dec. 20, 2006, now Pat. No. 7,764,622.

(51) Int. Cl.
*H04B 7/185* (2006.01)
*G06F 15/177* (2006.01)

(52) U.S. Cl.
CPC ....... *H04B 7/18584* (2013.01); *G06F 15/177* (2013.01)

(58) Field of Classification Search
None
See application file for complete search history.

(56) References Cited

U.S. PATENT DOCUMENTS

| | | | |
|---|---|---|---|
| 5,713,075 A * | 1/1998 | Threadgill et al. | 455/427 |
| 5,740,164 A * | 4/1998 | Liron | 370/316 |
| 6,374,202 B1 * | 4/2002 | Robinson | 709/223 |
| 7,293,086 B1 * | 11/2007 | Duffield et al. | 709/224 |
| 7,418,236 B2 * | 8/2008 | Levin et al. | 455/12.1 |
| 7,505,450 B2 * | 3/2009 | Castagnoli | 370/350 |
| 7,554,970 B2 * | 6/2009 | Rabinovitch et al. | 370/352 |
| 7,792,487 B2 * | 9/2010 | Monte et al. | 455/12.1 |
| 7,835,733 B1 * | 11/2010 | Panzani et al. | 455/428 |
| 2007/0032191 A1 * | 2/2007 | Marko | 455/12.1 |
| 2007/0072545 A1 * | 3/2007 | Karabinis et al. | 455/12.1 |
| 2007/0117509 A1 * | 5/2007 | Wang | 455/12.1 |

FOREIGN PATENT DOCUMENTS

GB 2115649 A * 9/1983

OTHER PUBLICATIONS

Burleigh et al. ("Delay-Tolerant Networking: An Approach to Interplanetary Internet" IEEE Communications Magazine. Jun. 2003. 128-136.*

(Continued)

*Primary Examiner* — Jeffrey R Swearingen
(74) *Attorney, Agent, or Firm* — Womble Bond Dickinson (US) LLP

(57) ABSTRACT

A method of designing an interplanetary communications network with an Artificial Neural Network (ANN) at each node. Object functions are generated that relate network characteristics and performance. Each object function is driven to an extreme (min or max) to provide an optimum network configuration. The optimum network configuration includes the number of nodes and the number of antennas for each node, node placement, specific node storage capacity and communications capacity for nodes and for links between nodes.

33 Claims, 8 Drawing Sheets

(56) References Cited

OTHER PUBLICATIONS

Farrell et al. ("Scaling an Interplanetary Internet", Proceedings of the International Conference on Recent Advances in Space Technologies, 448-453. Nov. 2003.*
Toung, Jerry et al. "A Split Implementation of the Dynamic Source Routing Protocol for Lunar/Planetary Surface Communications." 2006 IEEE Aerospace Conference.*
Perkins, C. "Ad hoc On-Demand Distance Vector (AODV) Routing." RFC 3561. Jul. 2003.*
Zhu, Jing et al. "Performance Modelling of TCP Enhancements in Terrestrial-Satellite Hybrid Networks." IEEE/ACM Transactions on Networking. vol. 14, No. 4, Aug. 2006. 753-66.*
Ian F. Akyildiz et al., "TCP-Planet: A Reliable Transport Protocol for InterPlaNetary Internet"; IEEE Journal on Selected Areas in Communications, vol. 22, No. 2, Feb. 2004.
Loren P. Clare et al., "Space-based Multi-hop Networking"; Computer Networks 47 (2005) 701-724.
Michael D. Noakes et al., "An Adaptive Link Assignment Algorithm for Dynamically Changing Topologies"; IEEE Transaction on Communications, vol. 41, No. 5, May 1993.
Chien-Chung Shen et al., "A flexible routing architecture for ad hoc space networks"; Computer Networks, vol. 46, No. 3, Oct. 2004.
Chien-Chung Shen et al., "Interrogation-Based Relay Routing for Ad Hoc Satellite Networks"; IEEE Globecom, Taipei, Taiwan, Nov. 17-21, 2002.
Ian F. Akyildiz et al. "InterPlaNetary Internet: State-of-the-Art and Research Challenges"; Computer Networks 43 (2003) 75-112.

\* cited by examiner

METHOD OF OPTIMIZING AN INTERPLANETARY COMMUNICATIONS NETWORK

CROSS REFERENCE TO RELATED APPLICATION

The disclosure is a continuation in part of U.S. Pat. No. 7,764,622, "INTERPLANETARY COMMUNICATIONS NETWORK, INTERPLANETARY COMMUNICATIONS NETWORK BACKBONE AND METHOD OF MANAGING INTERPLANETARY COMMUNICATIONS NETWORK," to Hesham El-Damhougy et al., filed Dec. 20, 2006; and related to U.S. Pat. No. 7,542,436, "TACTICAL COGNITIVE-BASED SIMULATION METHODS AND SYSTEMS FOR COMMUNICATION FAILURE MANAGEMENT IN AD-HOC WIRELESS NETWORKS," to Hesham El-Damhougy, filed Jul. 22, 2005; and to U.S. Pat. No. 7,742,425, "NEURAL NETWORKBASED MOBILITY MANAGEMENT FOR MOBILE AD HOC RADIO NETWORKS," U.S. Pat. No. 7,555,468, "NEURAL NETWORKBASED NODE MOBILITY AND NETWORK CONNECTIVITY PREDICTIONS FOR MOBILE AD HOC RADIO NETWORK," U.S. Pat. No. 7,693,120, "NEURAL NETWORK-BASED MOBILITY MANAGEMENT FOR SELF-PARTITION DETECTION AND IDENTIFICATION OF MOBILE AD HOC RADIO NETWORKS," and U.S. Pat. No. 7,848,262, "NEURAL NETWORK-BASED MOBILITY MANAGEMENT FOR HEALING MOBILE AD HOC RADIO NETWORKS," to Hesham El-Damhougy, all four filed Jun. 26, 2006; and to U.S. Pat. No. 7,881,217, "REMOTE GATEWAY SELECTION IN AN INTERPLANETARY COMMUNICATIONS NETWORK AND METHOD OF SELECTING AND HANDING OVER REMOTE GATEWAYS," to Hesham El-Damhougy et al., filed coincident herewith, all assigned to the assignee of the present application and incorporated herein by reference.

BACKGROUND

Technical Field

The embodiments of the disclosure generally relate to ad-hoc communications networks and, more particularly, to an ad-hoc interplanetary communications network for adaptable deep-space communications in an unstructured and self-supervised interplanetary or sub-planetary environment, such as between deep-space or lunar probes and earth.

Background Description

The National Air and Space Administration (NASA) is planning for future outer space exploration and, especially, for deep space interplanetary exploration in our solar system and beyond. Current plans allow for a yet-to-be-designed and developed interplanetary communications network to provide communication services between space borne entities (including deep space entities) and the earth. Primarily, the interplanetary communications network is expected to provide communication services for scientific data delivery and also provide navigation services for exploration spacecraft and orbiters in future deep space missions. The current vision for the infrastructure of this interplanetary communications network is similar to the Internet. See, e.g. Akyildiz et al., "InterPlaNetary Internet: state-of-the-art and research challenges," Computer Networks, 43 (2003). This as yet unrealized interplanetary communications network infrastructure or, Interplanetary Internet, is enabling networking technology for future deep space scientific exploration missions such as Mars and Neptune exploration and beyond.

Generally, an interplanetary communications network is expected to include communication between nodes at various space borne entities or locations, e.g., at fixed (celestially fixed) and/or mobile communications platforms. Individual nodes may include, for example, fixed (on a planet surface) sensors, and mobile nodes, e.g., robotics as well as human operated nodes. The nodes are expected to be distributed at numerous space borne locations and deep space entities. These entities may include, for example, robotic spacecraft and Crew Exploration Vehicles (CEV's); planetary platforms, e.g., orbital, local flight and surface planet (mobile and fixed) vehicles; and, sub-planetary probes, e.g., on moons, satellites, and asteroids.

Neither terrestrial Internet-based routing nor terrestrial mobile ad hoc routing protocols satisfy space communications parameter requirements because of additional constraints and requirements for space communications, such as burst data transfers between nodes in a short transfer window. A typical Earth-based wireless network includes fixed communications backbone nodes (e.g., base stations) that define cells, for example, connected together in the network. An earth network that lacks the fixed communications backbone nodes is known as an ad-hoc network. Instead, a group of autonomous (and frequently mobile) nodes define the ad-hoc Earth network. However, since there is no fixed frame of reference in space, node locations are in constant motion with respect to one another even at rest.

Consequently, backbone network structure is expected to be fluid and continually, dynamically changing, whether as a result of planetary rotation or orbital movement. Dynamically changing node locations cause connectivity among the network nodes to vary with time. Further, connectivity may change because of other interference, such as blockage of the line-of-sight communications path by a planet or from extra-network interference, e.g., sunspot activity. This continual connectivity change makes network infrastructure time varying also and difficult to pre-define, especially as the total number of nodes gets large. Thus, the interplanetary communications network is expected to be an ad-hoc network, primarily of autonomous nodes self-managing and self-maintaining connectivity in spite of the fluidity of the network communication paths.

These autonomous nodes must assure some form of network connectivity to maintain end-to-end communications for mission success. This is especially important for exchanging large volumes of data that may be collected by various space borne network platforms. Therefore, the network nodes themselves must automatically self-configure/self-provision nodes/platforms along network paths to deliver the expected volume of data. Furthermore, this must be with minimal or no manual intervention/interference, as none may be available. Given that even when a communications window is available between two nodes, there may still be a relatively long transmission path lag time or propagation delay, even between two relatively close communicating nodes, e.g., on the moon and on the Earth. Therefore, Akyildiz et al. describe several significant challenges and issues that must be addressed and resolved before interplanetary communications network objectives may be realized.

Specifically, backbone layer routing is a serious problem area with key previously unresolved challenges. Traditional Shortest Path Algorithms (SPA) include, for example, the Bellman-Ford algorithm and Dijkstra's algorithm. The Bellman-Ford algorithm has been realized by the known Internet Border Gateway Protocol (BGP). Dijkstra's algorithm has been realized by the Internet Open Shortest Path First (OSPF) protocol for Autonomous Systems (AS). The interplanetary communications network will not have a traditional end-to-end path because of long periods (minutes, hours or even days) of no connectivity between nodes and groups of nodes. End-to-end connectivity is not guaranteed and, if it occurs, it may be only sporadic. Therefore, traditional end-to-end routing approaches are unsuitable for interplanetary communications network routing. Moreover, because of nodal motion, it may be difficult to identify an end-to-end path because performance/routing metrics (e.g., propagation and connectivity metrics) are time-dependent. Consequently, optimal or suboptimal routes are time-dependent. This time-dependence makes both the Bellman-Ford algorithm and Dijkstra's algorithm inadequate.

With current technology interplanetary missions can take years to reach their objectives. Thus, distant nodes are likely to be the oldest and have the oldest equipment. Consequently, for example, because storage density increases with each new generation, storage is likely to be denser and more plentiful at nodes closer to Earth and scarcer at distant nodes. Thus, storage capacity may be in short supply and, therefore, very costly at these distant nodes as well as other intervening nodes in the network paths. As a result, long term storage requirements for storing data when a connection is unavailable can cause storage contention and overflow at those distant or intervening nodes, e.g., from data arriving simultaneously from several distant nodes. Therefore, locating and planning an optimal route requires complete knowledge and consideration of network path resources as well as key time-dependent network parameters, e.g., contact times and orbital parameters, and traffic loads and node queuing delays.

Furthermore, an interplanetary communications network is likely to be an amalgamation of sub-networks that are based on different distinct network protocols. These distinct network protocols must communicate with the network through strategically located gateways. However, maintaining an even data traffic flow between network nodes that are based on different distinct network protocols requires that network gateways seamlessly convert between network protocols. Though gateway positions are predictable, they are also normally time varying (e.g., satellites orbiting about a distant planet). This variation in location further complicates gateway selection and handover by network nodes, both locally to the gateway and in the network backbone.

Accordingly, there is a need for a network design method for designing a self organizing interplanetary communications network for deployment. More particularly, there is a need for a design method for pre-selecting interplanetary communications network components and component locations before network deployment and for planning for network infrastructure changes after deployment, including changes (additions and/or deletion) of network elements e.g., adding new backbone satellites, retiring old satellites.

SUMMARY

An advantageous embodiment includes a method of designing an interplanetary communications network with an Artificial Neural Network (ANN) at each node. During planning and before network deployment, object functions are generated that relate network characteristics and performance. Each object function is driven to an extreme (min or max) to provide an optimum network configuration. The optimum network configuration includes the number of nodes and the number of antennas for each, node placement, specific node storage and communications capacity and allowable traffic flow for links between nodes, i.e., static routing. After initial planning and deployment, network elements may be added or removed for further optimization, e.g., backbone nodes or nodes on planets or satellites.

Advantageously, by optimizing an interplanetary network by design according to an advantageous embodiment, at least upon an initial network node placement, nodes are located for optimal connectivity throughout the network to provide adequate local storage capacity and so that network bottlenecks do not drag down network performance. Nodes are equipped with sufficient (storage and communications) capacity to adequately meet expected network demands. Thus, by design the preferred network is performance balanced with each node having adequate storage capacity and a sufficient number of antennas to satisfy link communications capacity

BRIEF DESCRIPTION OF THE DRAWINGS

The foregoing and other objects, aspects and advantages will be better understood from the following detailed description of an advantageous embodiment of the disclosure with reference to the drawings, in which.

DETAILED DESCRIPTION

Figure 1A:
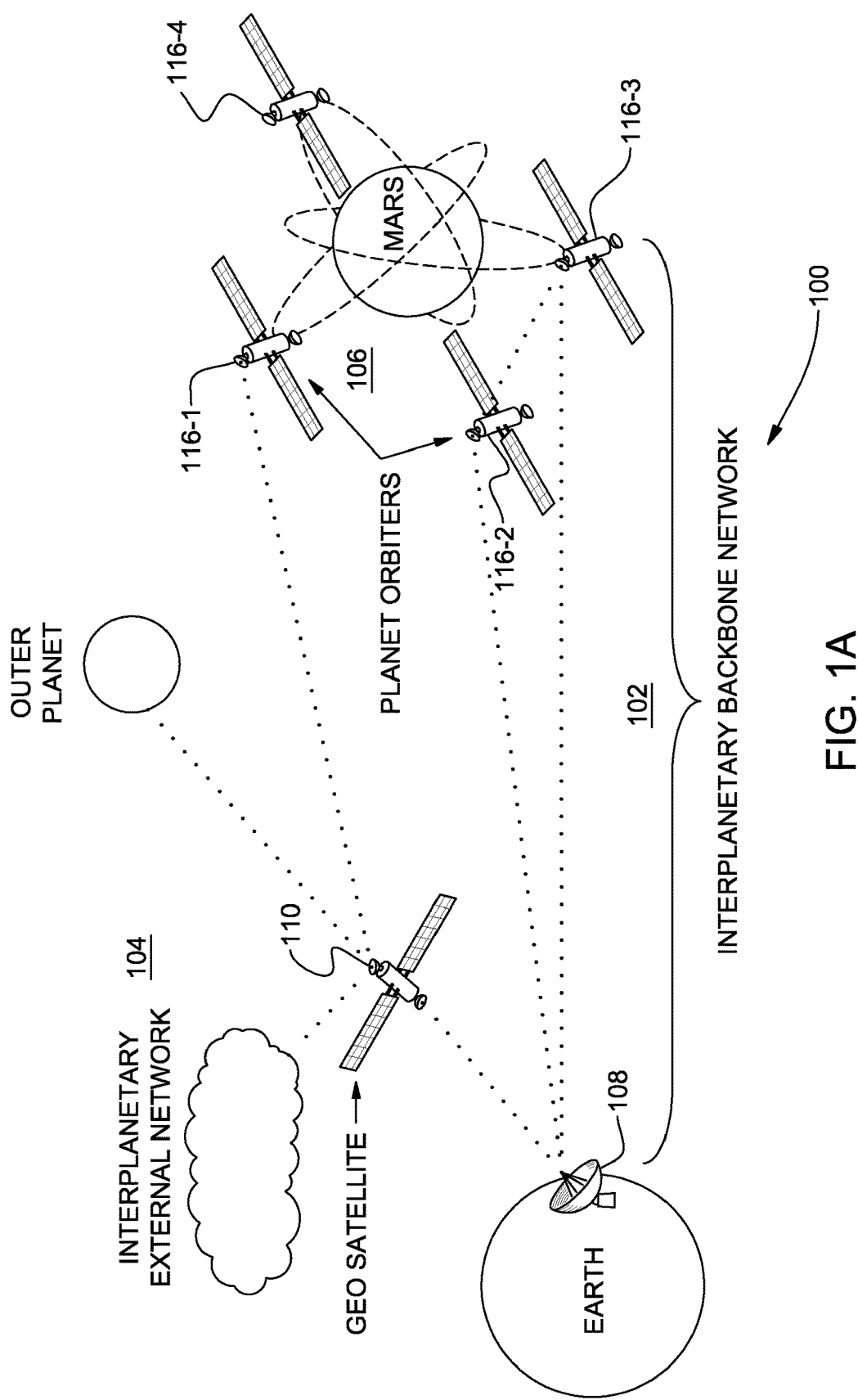
FIGS. 1A-B illustrates an example of a hierarchical interplanetary communications network or Interplanetary Internet, trained off-line for static routing and network planning and for handling gateway selection according to an advantageous embodiment.
Figure 1B:
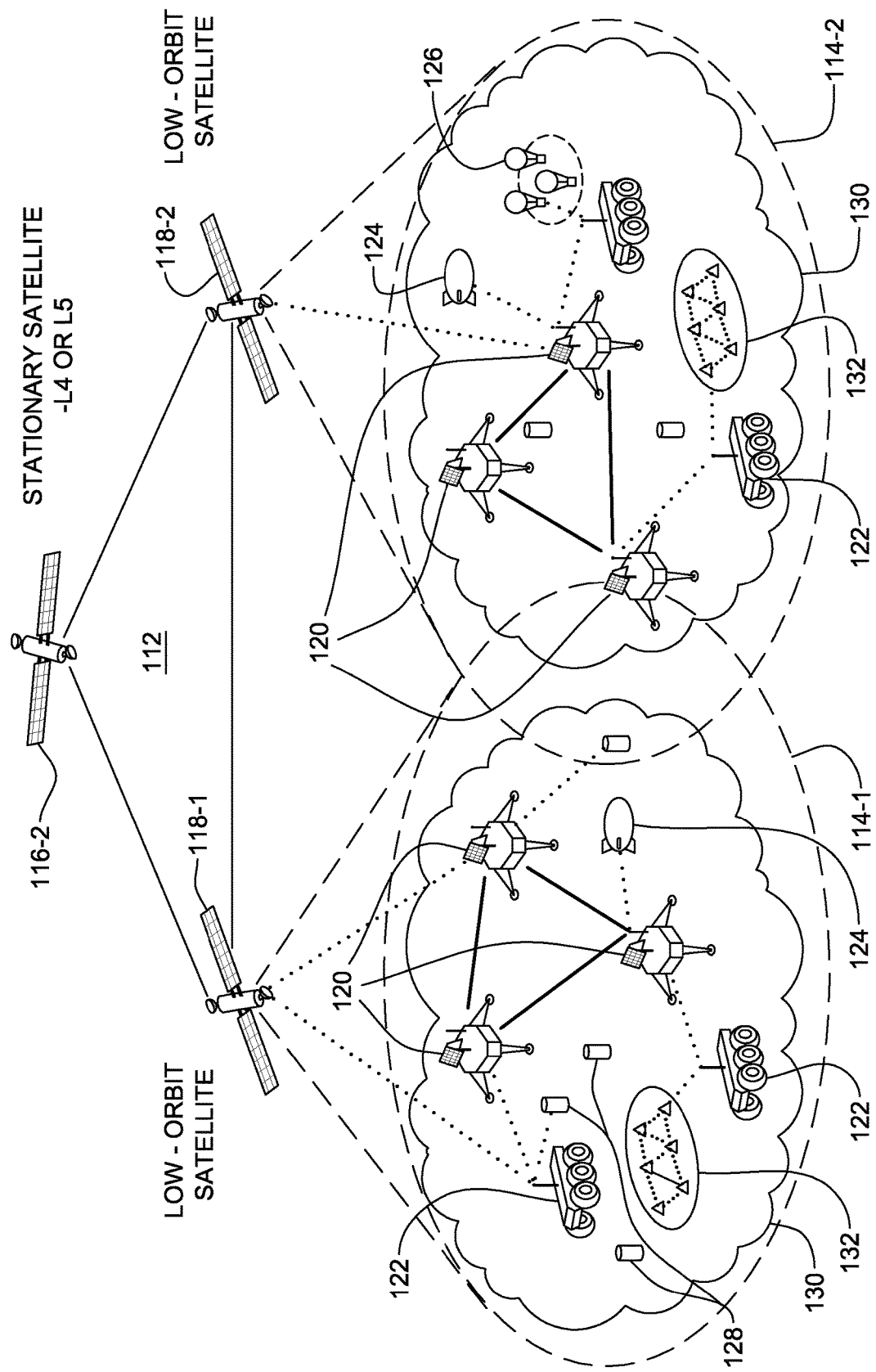

Turning now to the drawings, FIGS. 1A-B illustrate an example of a hierarchical interplanetary communications network 100 or Interplanetary Internet, designed and optimized according to an advantageous embodiment of the disclosure and referred to herein as an Interplanetary Communications Neural Network (ICNN). Preferably, ICNN nodes are hierarchically organized with: a primary system or sub-network (interplanetary backbone network 102); an autonomous intermediate system or sub-network (interplanetary external network 104 with nodes having predictable trajectories); and, one or more tertiary systems or sub-networks (e.g., planetary network(s) 106). The autonomous intermediate sub-network 104 and tertiary sub-networks 106 may periodically attach to the interplanetary backbone network 102. The specific network configuration, including the location and number of nodes, communications and storage capacities of each backbone node and communications capacity of nodes linking to the backbone, as well, are selected for optimum network performance according to an advantageous embodiment of the disclosure.

Preferably, the ICNN 100 is a self-monitoring ad-hoc network with an Artificial Neural Network (ANN) in each node in an Adaptive Self Organizing Neural Network (ASONN). Further, each ANN node adapts and learns from surrounding (dynamically) environmental conditions, and may be in hardware or software. There are several different types of ANN nodes that may be suitable as ICNN nodes for different types of applications within the network 100. These different types include feed-forward ANN nodes that learn with a teacher; recurrent ANN nodes that learn with or without a teacher; and, self organizing ANN nodes that learn without a teacher. Most frequently, ANNs are implemented in feed-forward nodes that are trained using what is normally referred to as a Back Propagation (BP) Algorithm. In general an ANN is relatively robust, simple to train and self-repairing network.

The ICNN nodes may be space borne, airborne and ground based communications units or stations. With ICNN nodes selected and located as described herein, the preferred hierarchical interplanetary communications network 100 includes an optimized number of nodes at optimized node capacities and with node placement based on predicted and measured communications termination points, communications loads and path parameters. Once selected and in place, the ICNN nodes are trained off-line for static routing and network planning.

The backbone network 102 automatically and dynamically routes communications that originate/terminate at one or more fixed earth stations 108, for example, directed to gateways in planetary networks 106. An example of managing backbone communications is described in U.S. patent application Ser. No. 11/613,839, entitled "INTERPLANETARY COMMUNICATIONS NETWORK, INTERPLANETARY COMMUNICATIONS NETWORK BACKBONE AND METHOD OF MANAGING INTERPLANETARY COMMUNICATIONS NETWORK," to Hesham El-Damhougy et al. (hereinafter "Backbone"), filed Dec. 20, 2006, assigned to the assignee of the present invention and incorporated herein by reference.

Communications routes may be direct or indirect, i.e., through intermediate nodes, such as, passing through geostationary (GEO) satellite 110 in the interplanetary external network 104. The interplanetary external network 104 provides shorter-range links through nodes 110 that have predictable trajectories with a time varying attachment to the interplanetary backbone network 102. These nodes 110 in the interplanetary external network 104 may be, for example and without limitation, groups of spacecraft in deep space, spacecraft between planets, sensor node clusters, and groups of space stations.

In addition, preferably based on the universal approximation property of multi-layer perceptron (MLP) neural networks, an ANN can do almost anything a computer does without a priori knowledge of all possible outcomes required in a fixed computer program. Thus, ANNs may have application to any computable or recursive function. Such functions are objective functions that may include, but are not limited to, for example: tasks that involve prediction/forecasting (e.g., financial forecasting and highway safety tasks); adaptive filtering and system identification tasks (e.g., adaptive equalizers and for speech/image recognition); data mining tasks (e.g., data clustering and fault/failure diagnosis); and, combinatorial optimization tasks (both linear and non-linear). Thus, an advantageous interplanetary communications network 100 is a hierarchical network of ANN nodes (or ICNN nodes) trained to use many of these ANN functions. Preferably, the ANN nodes are trained substantially as described in U.S. Pat. No. 7,542,436, "TACTICAL COGNITIVE-BASED SIMULATION METHODS AND SYSTEMS FOR COMMUNICATION FAILURE MANAGEMENT IN AD-HOC WIRELESS NETWORKS," filed Jul. 22, 2005, assigned to the assignee of the disclosure and incorporated herein by reference.

FIG. 1B shows an example of a tertiary planetary network 106 in more detail. Each tertiary planetary network 106 may include a planetary satellite network 112 and planetary surface networks 114-1, 114-2. The planetary satellite network 112 in this example, includes a planet stationary satellite 116-2 (equivalent to geostationary or other high-orbit relay satellite including 116-1, 116-3, 116-4 in FIG. 1A) and low orbit satellites 118-1, 118-2, analogous to low Earth orbit satellites. Furthermore, these networks or sub-networks 102, 104, 106, 112, 114-1, 114-2 may each operate based on a different protocol. The sub-networks 102, 104, 106, 112, 114-1, 114-2 may use different routing algorithms. Moreover, the sub-networks 102, 104, 106, 112, 114-1, 114-2 may interface with each other through a designated gateway node (e.g., a planet stationary satellite 116-1, 116-2, 116-3, 116-4) in the particular network or sub-network. So, for example, the planetary satellite network 112 may be based on an high level protocol, while planetary surface networks 114-1, 114-2 may incorporate suitable land mobile wireless ad-hoc routing protocols, modified for energy awareness.

The interplanetary backbone network 102 may include a number of nodes, e.g., planet stationary satellite 116-2, that may be designated as a gateway for interplanetary communications. Preferably, gateways are selected as described in U.S. Pat. No. 7,881,217, "REMOTE GATEWAY SELECTION IN AN INTERPLANETARY COMMUNICATIONS NETWORK AND METHOD OF SELECTING AND HANDING OVER REMOTE GATEWAYS," to Hesham El-Damhougy et al., filed coincident herewith, assigned to the assignee of the present application and incorporated herein by reference. The planet stationary satellites (116-1, 116-2, 116-3, 116-4) may be located at Lagrangian points ($L_4$ or $L_5$) in the interplanetary backbone network 102 and, when selected, act as a gateway node for interplanetary/extraplanetary communications with the particular planetary surface networks 114-1, 114-2. Nodes in the planetary surface networks 114-1, 114-2 may include any suitable land based or low altitude wireless communications capable vehicle. So, for example and without limitation, each of the planetary surface networks 114-1, 114-2 may include suitable numbers of lander vehicles 120 providing a local network backbone; terrain based craft or rovers 122; flying nodes such as aircraft 124 (e.g., a piloted and/or drone aircraft) and balloons 126; fixed/deployed probes 128 and/or sensors 128, e.g., a sensor array 130.

In terrestrial-style networks such as planetary surface networks 114-1, 114-2, connectivity may be changing continually due to erratic local node movement. Communications connectivity within planetary surface networks 114-1, 114-2 may be treated as equivalent to a suitable earth-based ad-hoc network. Such a suitable Earth-based ad-hoc network is described in U.S. Pat. No. 7,742,425, "NEURAL NETWORK-BASED MOBILITY MANAGEMENT FOR MOBILE AD HOC RADIO NETWORKS," U.S. Pat. No. 7,555,468, "NEURAL NETWORK-BASED NODE MOBILITY AND NETWORK CONNECTIVITY PREDICTIONS FOR MOBILE AD HOC RADIO NETWORK," U.S. Pat. No. 7,693,120, "NEURAL NETWORK-BASED MOBILITY MANAGEMENT FOR SELF-PARTITION DETECTION AND IDENTIFICATION OF MOBILE AD HOC RADIO NETWORKS," and U.S. Pat. No. 7,848,262, "NEURAL NETWORK-BASED MOBILITY MANAGEMENT FOR HEALING MOBILE AD HOC RADIO NETWORKS," all four filed Jun. 26, 2006, assigned to the assignee of the present application and incorporated herein by reference.

The interplanetary backbone network 102, by contrast includes a much smaller number of predictably moving nodes than a typical terrestrial network. Communications between distant nodes (e.g., 116-1, 116-2, 116-3, 116-4 in FIG. 1A) on planets (e.g., Mars) or non-planets (e.g., Pluto) may be characterized by large propagation delays, i.e., tens of seconds to tens of minutes or more. So typically, for example and without limitation, the interplanetary backbone network 102 may include tens of nodes 110, 116-1, 116-2, 116-3, 116-4 or even fewer. When connected and/or linked, these backbone nodes 110, 116-1, 116-2, 116-3, 116-4 form a communication backbone that may be treated as more or less connected by dedicated point-to-point links.

Due to relative movement, e.g., orbital motion, links to some nodes 110, 116-1, 116-2, 116-3, 116-4 are continually changing with most links occurring only intermittently. Thus, by design the interplanetary backbone network 102 is dynamic, albeit on a much coarser time scale than planetary systems 106, and continuously self-partitioning and self-healing network that is time varying depending upon node 110, 116-1, 116-2, 116-3, 116-4 positions. Since some nodes 116-1, 116-2, 116-3, 116-4 are selected to have only intermittent availability, all data through those nodes 116-1, 116-2, 116-3, 116-4 must be transferred when the node 116-1, 116-2, 116-3, 116-4 is available, i.e., during a window of opportunity.

The preferred network is designed to minimize constraints to communications external to the backbone 102, in spite of intermittent availability from limited and/or intermittent connectivity, that in more extreme cases may make communications with remote nodes scarce. So by analyzing network performance to identify specific needs, e.g., identifying node and/or link bottlenecks, an ANN may be selected for each node with sufficient capacity to handle the required data communications workload to/from other linked nodes. By designing the network (e.g., node location, node storage capacity and the number of transmitters/antennas) off-line and prior to placement according to an advantageous embodiment of the disclosure, the network is optimized for communications routing and network performance by design.

Figure 2:
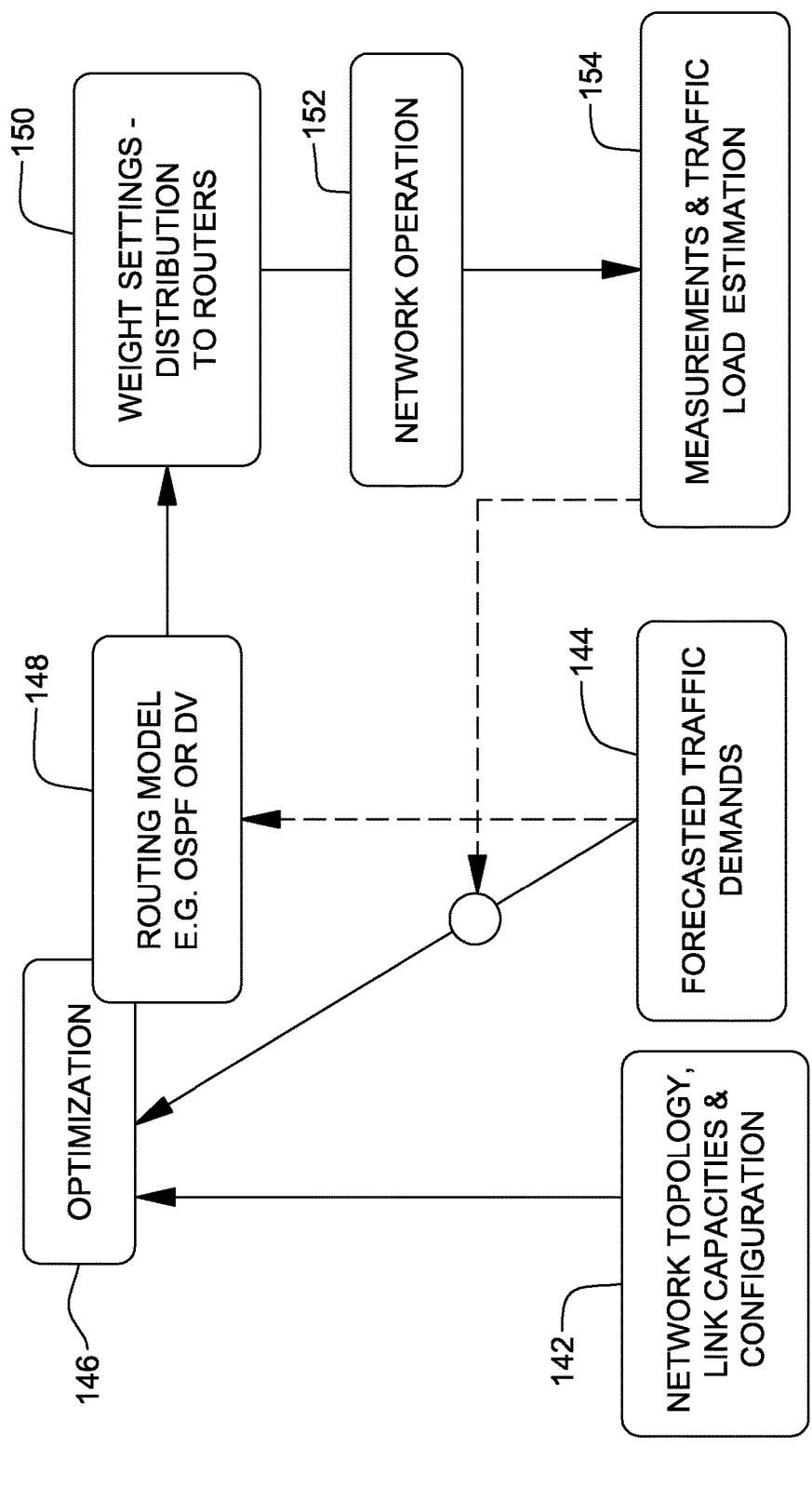
FIG. 2 shows an overview example of an advantageous ICNN traffic engineering framework for off-line network optimization in a centralized approach.

FIG. 2 shows an overview example of an advantageous ICNN traffic engineering framework 140 for off-line network optimization in a centralized approach according to an advantageous embodiment of the disclosure. Inputs include an initial network description 142 and an initial expected network utilization 144. Preferably, the initial network description 142 includes a network topology description, a description of the network configuration and routing metrics. The routing metrics include specific link capacities that may include a time varying link description for the entire network, e.g., a window matrix (W(t)). Each entry ($\omega_{ij}$) in W(t) indicates time varying link windows between a respective two adjacent nodes i and j. Preferably also, the initial expected network utilization 144 provides link and node demand forecasts, e.g., as a forecasted traffic demand matrix. Generally, demand is asymmetric with more traffic flowing in one direction (e.g., towards earth) than in the other. The initial network description 142 and the expected network utilization 144 are provided for network flow optimization 146 in a subjective determination. Based on these initial descriptions, network flow optimization 146 generates a routing model 148.

The routing model 148 defines communications routes between nodes, especially, between nodes n and m at opposite ends of the network. So for example, the routing model 148 defines communications between an earth node 108 and a planet gateway 116-1, 116-2, 116-3 or 116-4. Preferably, the network flow optimization 146 minimizes both maximum and average link utilization and maximizes total residual bandwidth to generate the routing model 148. The routing model 148 may be based on any suitable routing model such as or a time-dependent distance vector (DV) or an Open Shortest Path First (OSPF) approach. The routing model 148 also provides weighting 150 for links in traffic flowing between source and destination pairs and for following shortest paths. A network operation model 152 generates heuristic estimates of traffic demand 154. These heuristic estimates are fed back and substituted for the initial network utilization 144 for Network Flow Optimization 146 in a recursive solution.

As shown hereinbelow, the recursive solution from network flow optimization 146 provides a linear model or models for optimizing to determine the required number of transmitters/antennas of each ICNN spacecraft (or space station) backbone node. Further, the recursive solution may include a non-linear model or models for determining optimal link capacities (between each pair of network nodes) and determining optimal buffer/storage capacity for each node. Also, the recursive solution may include a linear or non-linear model or models, for optimizing traffic flow scheduling for link and node communications.

Figure 3:
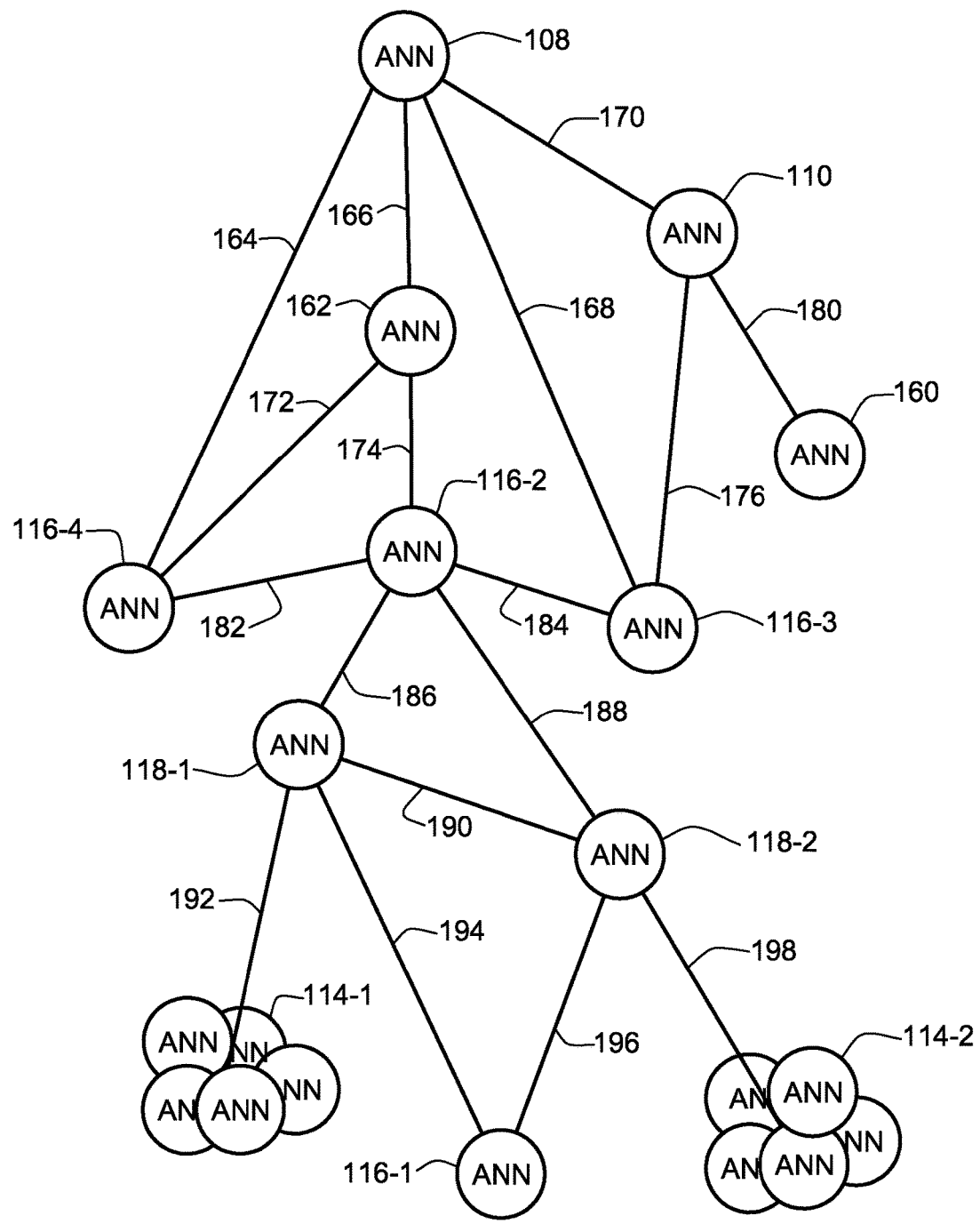
FIG. 3 shows a graphical representation of the ICNN example of FIGS. 1A-B.

FIG. 3 shows a graphical representation of the ICNN example 100 of FIGS. 1A-B. e.g., at an instant in time. GEO satellite 110 linking to outer planet 160 represents the interplanetary external network (104 in FIG. 1A). A single node 162 represents a second external network. For convenience of discussion, planetary surface networks 114-1, 114-2 are treated collectively as a single node and connected with low orbit satellites 118-1, 118-2. External (to planetary surface networks 114-1, 114-2) communications pass through the respective low orbit satellites 118-1, 118-2. Edges 164-198 represent a communications window between respective linked nodes 108, 110, 114-1, 114-2, 116-1, 116-2, 116-3, 116-4, 118-1, 118-2, 160 and 162. Also, it is understood that, although not shown in FIG. 3, planet stationary satellite nodes 116-2, 116-3 and 116-4 are linked to low orbit satellites 118-1, 118-2. As the planet rotates, even with a direct line of sight to Earth node 108, planet stationary satellite nodes 116-1, 116-2, 116-3, 116-4, rotate with the planet. This rotation changes which planet stationary satellite node 116-1, 116-2, 116-3, 116-4 is in contact with Earth node 108 at any particular time. So, although at this time planet stationary satellite node 116-4 does not have a window to Earth, it is linked directly or indirectly to Earth node 108.

So, for each pair of nodes i and j, linked in a path between nodes n and m, each link (i to j) includes time varying windows ($\omega_{ij}$) 164-198, where a window occurs whenever the two nodes are visible to each other and can communicate, e.g., in Line-Of-Sight (LOS), point-to-point. Thus, the windows ($\omega_{ij}$) are represented by binary activation functions (i.e., $A_{ij}=1$ or 0), with connection defined over each contact window according to:

$A_{ij}:\omega_{ij} \to \{0,1\}$, where $A_{ij}=1$ if the respective link (i, j) is active;
0 otherwise.

It should be noted that although activation function is indexed by contact window (i.e., $^{\omega ij}A_{ij} \sim A_{ij}$), discussion of this indexing is omitted herein for simplicity. Further, normally during optimization, the activation functions are unknown. Once the activation functions and a maximum communications load are determined, an optimum number of transmitters and antennas may be determined for each node.

Since nodes are fixed on planets or located in the backbone, e.g., GEO or LEO satellites, these nodes have orbital motion. Consequently, these nodes have contact windows to other nodes that may occur periodically because of this orbital node motion. Thus, the window matrix for a k node backbone network (where k is 12 in the example of FIG. 3) has the form $W=\{\omega_{ij}: i,j \in G=\text{network nodes}\}$. Each window has the form $[t\omega_{ij1}, t\omega_{ij2}]$. So, for this example, with planet stationary satellite nodes 116-1, 116-2, 116-3, 116-4 having respective k values of 5, 6, 7 and 8, link 182 is matrix element $\omega_{68}$.

Unreachable nodes do not have windows to a current node. Only those nodes that have windows to a particular node are in the neighborhood ($N_i$) of node i. $N_{ij}$ is the set of links to a neighboring node. Since at any one time, some neighbors are inactive, $N(\omega_{ij})$ is the set of active windows to neighbors during windows between nodes i and j, i.e., where $A_{ij}$ is 1 (whenever this link activation function is selected during optimization) during a particular window, $\omega_{ij}$. Further, potential waiting periods (CW) is the complement of W. So, CW includes those periods when nodes are not linked and cannot receive data.

Figure 4:
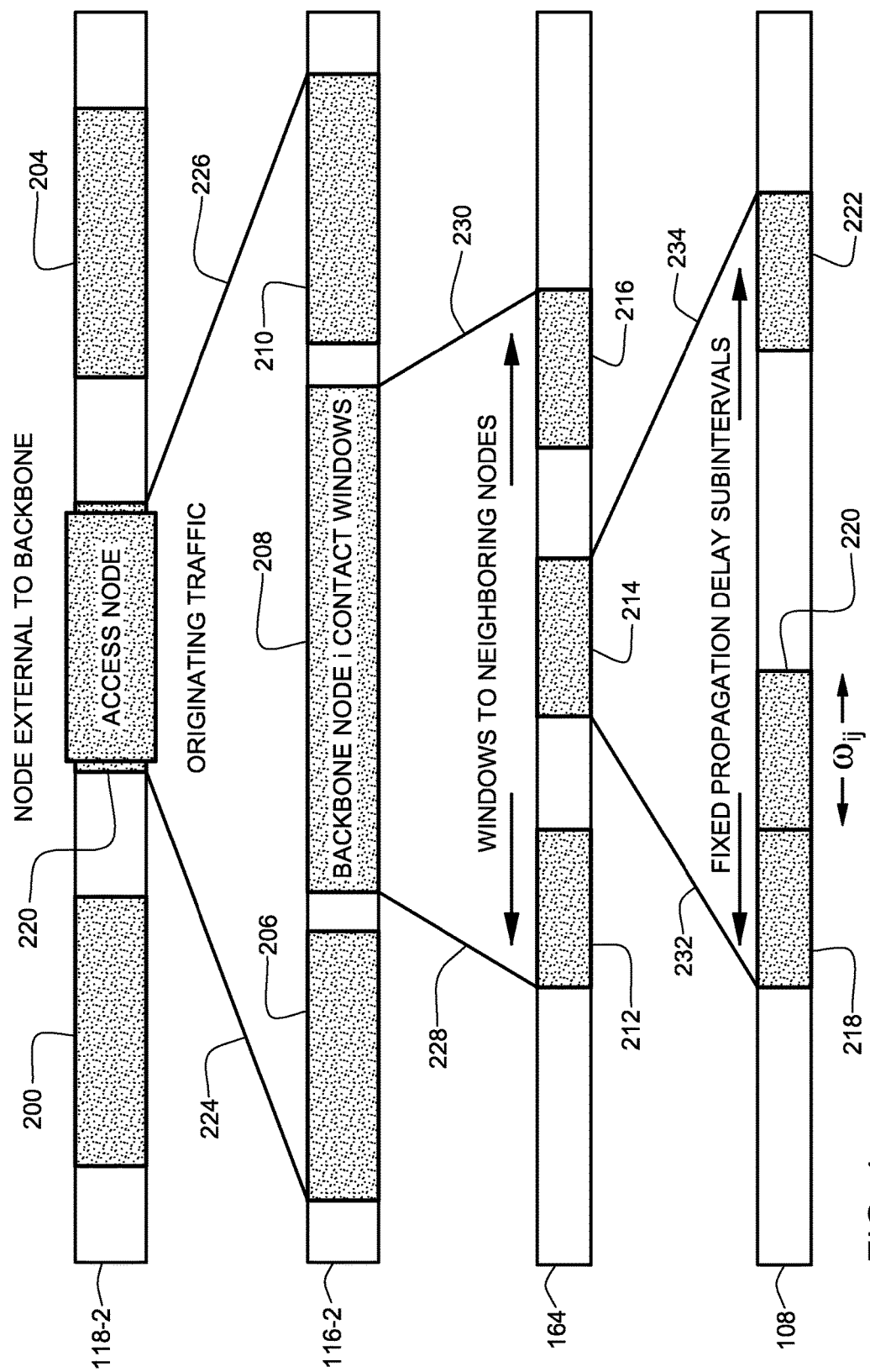
FIG. 4 shows a graphical representation of contact windows for a single network time period at various representative nodes in the network.

FIG. 4 shows a graphical representation of contact windows for a single network time period at various representative nodes in the network with reference to FIGS. 1A-B and 3. This may represent, for example, windows at a non-backbone node (e.g., 118-2) linked to a backbone or gateway node (e.g., 116-2) that, in turn, is linked to a neighboring intermediate backbone node (e.g., 162) linked to an Earth node, e.g., 108. A low orbit satellite node 118-2, which is external to the backbone 102 in this example, has windows 200, 202 and 204 to adjacent nodes, e.g., planet stationary satellite node 116-2. A planet-stationary satellite node 116-2 has windows 206, 208 and 210 to adjacent nodes, e.g., second external network node 162. A second external network node 162 has windows 212, 214 and 216 to adjacent nodes, e.g., Earth node 108. Similarly, Earth node 108 has windows 218 (which includes sub-window 220) and 222 to adjacent nodes, e.g., second external network node 162. Each node i has a maximum number of active links ($\alpha_i$) to its neighbors. Propagation delays ($d_{ij}$), preferably, are treated as constants between node pairs and are represented by edges 224, 226, 228, 230, 232, 234.

So, for this example, the selected time period is the longest time for round trip communications between two adjacent nodes. Specifically, incoming transmission 224 to low orbit satellite node 118-2 sent from planet stationary satellite node 116-2 arrives at the beginning of window 202; followed by outgoing transmission 226 from low orbit satellite node 118-2 at the end of window 202 to planet stationary satellite node 116-2. Windows 200 and 204 may represent windows to planet stationary satellite node 116-2, e.g., when data may be sent in 200 to arrive in 208 or, data originating at 116-2 may be sent in 208 to arrive in 204. Also, sub-windows (e.g., sub-window 220) may be defined in each window 200, 202, 204, 206, 208, 210, 212, 214, 216, 222. A sub-window is a period of fixed propagation delay contained in a window.

It is clear from this example that the round trip communications time (the system time period in this example) may be shortened significantly. Specifically, adding a number of intervening nodes between low orbit satellite node 118-2 and planet stationary satellite nodes 116-1, 116-2, 116-3 and 116-4 shortens propagation delay for these nodes 118-2, 116-1, 116-2, 116-3 and 116-4 with neighboring nodes. However, if adding nodes increases node workload(s), adding nodes may provide less than a full performance benefit.

If added workload exceeds node or link capacity ($C_{ij}$), that excess causes transmission delays (e.g., from retransmissions or from a node storing excess unsent data locally until the next window) or data losses that degrade performance. Each link from node i to node j has traffic requirements ($M_{ij}$), e.g., measured in bits per second or data volumes in octets. Network traffic requirements as a function of contact windows (n) may be determined and expressed by a demand matrix M(W)), where $M(W)=[M_{ij}]$. During planning, expected traffic requirements are projected in an initial contact window. It should be noted that traffic demands are typically time-based forecasts for each source-destination pair residing outside the backbone infrastructure, i.e., based on external node contact window opportunities. After the initial contact window, periodically, M(W) may be measured online and reported to a central management system for network optimization. The per unit cost ($B_{ij}$) of data through a node i to a second node j is time dependent and based on arrival at node i (i.e., whether at or between windows) and propagation delay.

Moreover, even if nodes have inadequate local storage ($b_i$) to handle the traffic demands, relayed data ($K_i$) that passes though a node with a buffer cost, $buff_i$, may cause data losses and adds delay ($S_{ij}$) to the transmission. By addressing these problems in network design as described herein, before placing the network nodes, nodes may be selected in sufficient numbers, with sufficient capacity (storage and antennas) and located at optimum locations to avoid the problems or, at least, to optimize performance within available resources. The total network cost can be modeled for optimization by objective functions that may be used to select an optimal network configuration.

By modeling the network performance, node and link capacity and node assignments may be traded off for an optimized solution. Moreover, network resource usage may be traded for residual capacity, such that the network meets/satisfies traffic demands from the beginning. In particular, performance optimization may be achieved by maximizing both total and average residual link/node capacity and, especially the maximizing bottlenecked link and buffer residual capacity, preferably using Mixed Integer Linear Programming (MILP) solution methods. An upper bound of network performance may be determined by optimizing performance of the most congested link. This may be accomplished by: maximizing the minimum link or buffer residual capacity; minimizing the most bottlenecked link or buffer utilization; or maximizing the most bottlenecked link or buffer residual capacity.

Objective functions for performance optimization are substantially analogous to objective functions for optimizing network and capacity assignment. For performance optimization the capacity of each link i may be represented as $a_i$, and the required volume for demand j as $b_j$; for a particular (unknown) communications vector (x) over the network, the objective function is a cost/utilization function, $f(x)$, that compares weighted network cost to weighted utilization. However, when driven to a limit (min or max) subject to network constraints, $f(x)$ provides an optimal network configuration at that limit. In particular, the network constraints include: the total link load ($g_i \le a_i$, i=1, 2, ..., m); the allocation of flow responsive to demand ($h_j = b_j$, j=1, 2, ..., n); x∈X=set of feasible solutions; and f:X→R=Real Numbers. Provided $f(x)$, $g_i$ and $h_j$ are linear, the solution is a Linear Programming (LP) or MILP problem. Otherwise, a specialized heuristic is required.

The system objective functions, as well as the particular optimization approach, depend upon current system definition, i.e., whether or not link and node storage (buffer sizes) capacities are known at the start of optimization.

Figure 5:
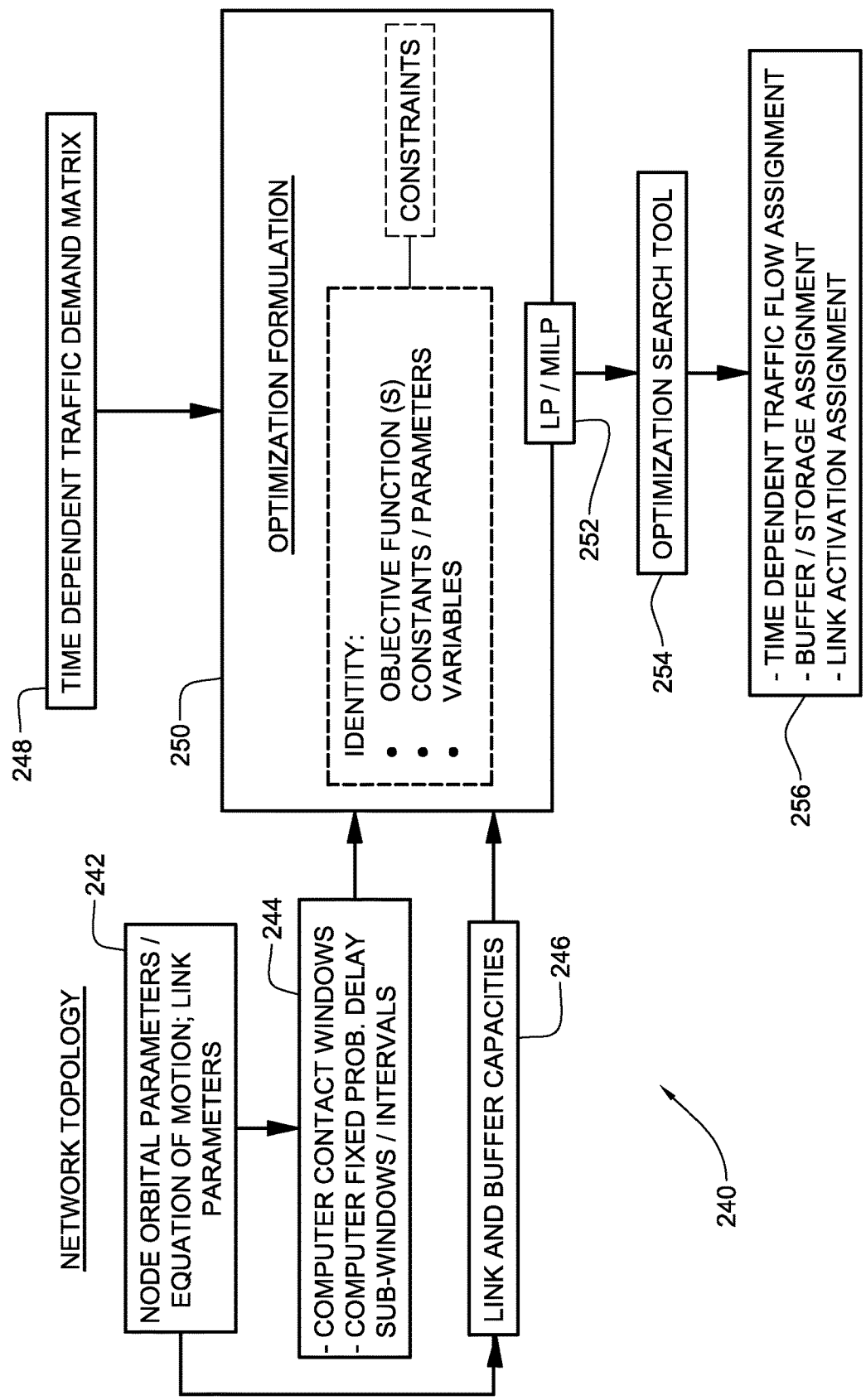
FIG. 5 shows an example in more detail of design and capacity assignment optimization.

When link and node capacities are known, performance optimization of the operational network 240 may be done as shown in the example of FIG. 5. First, network topology is defined by providing node parameters 242 including node orbital parameters, a description of the motion of each node (e.g., as an equation) and in this example, link parameters. The node parameters 242 are provided both to generate a network communications description 244 and link and buffer capacity description 246. Typically, the network communications description 244 includes a contact window matrix (W) and the likelihood of sub-window/interval delays. The network communications description 244, link and buffer capacity description 246 and traffic demand matrix 248 (forecast or measured) are passed to optimization formulation 250. Optimization formulation 250 collects network variables, parameters, constants and constraints to generate network specific optimization objective functions ($f(x)$). As noted hereinabove, when the functions $f$, $g_i$ and $h_i$ are linear, exact solutions may be derived using LP or MILP methods 252. The results are passed to a suitable state of the art optimization search tool 254, preferably, suitably customized to identify network capacity assignments 256. The network capacity assignments 256 may include, for example, time dependent traffic flow, node buffer/storage and link and buffer communications capacity.

Optimization may be for total network residual capacity, for average residual capacity and link or for buffer utilization of network bottlenecks. Optimization input parameters (summarized in Table 1) include network traffic parameters considered for maximizing total network residual capacity, average residual capacity and link and buffer utilization of network bottlenecks.

TABLE 1

Optimization Input Parameters (known capacities)

| | |
|---|---|
| W: | Set of contact windows; $\{\omega_{ij}: i, j \in G$ = network nodes$\}$ |
| CW: | Complement of W |
| M(W): | Traffic load requirements over link ij, $[M_{ij}]$ |
| $N(\omega_{ij})$: | Set of available links between node i and its neighbors during contact Window $\omega_{ij}$ |
| $\alpha_i$: | Maximum number of active links between node i and its neighbors |
| $N_{ij}$: | Number of available links between node i and its neighbors during a contact window $N_{ij}$ = Cardinal $[N(\omega_{ij})]$ |
| $C_{ij}$: | Capacity of the link between neighboring pair (i, j); where (i, j) ∈ $N(\omega_{ij})$ |
| $B_{ij}$: | Cost of transporting a data unit (e.g. a single bit) through node i (or link (i, j) ∈ $N(\omega_{ij})$). This is a time dependent cost that includes the associated propagation delay cost between nodes i, j, $B_{ij} = S_{ij} + d_{ij}$. |
| $b_i$: | The buffer size of node i. |
| $buff_i$: | Storage cost of storing a datum at node i, e.g., a datum may be a single bit or an octet |

Parametric outputs (variables with unknown original values) from this optimization in any one window, have total traffic on a link ($^\omega F_{ij}$) that is the sum of end-to-end traffic (originating at n and terminating at m) over the link ($^\omega X^{nm}_{ij}$). The total traffic stored at a node ($^\omega K_i$) is the sum of the traffic to adjacent nodes ($^\omega K_{ij}$). End-to-end traffic, temporarily stored at node i ($^\omega K^{nm}_i$), includes path traffic ($^\omega K^{nm}_{ij}$), stored between windows. So for optimization based on known link and node capacities, optimization output variables (summarized in Table 2) include window traffic parametric variables considered for maximizing total network residual capacity, average residual capacity and link and buffer utilization of network bottlenecks.

TABLE 2

Optimization Output Variables (known capacities)

| | |
|---|---|
| $^\omega X^{nm}_{ij}$: | Traffic load on link i, j traveling end-to-end from node n to node m |
| $^\omega F_{ij}$: | Total traffic load on link i, j during the window of opportunity |
| $^\omega K^{nm}_{ij}$: | Traffic at node i passing through node j traveling in a particular end-to-end path from node n to node m, stored during complement of contact window i.e., when no contact window available |
| $^\omega K^{nm}_i$: | Total traffic stored at node i in a particular end-to-end path from node n to node m |
| $^\omega K_{ij}$: | Total link traffic stored at node i |
| $^\omega K_i$: | Total traffic stored at node i; $^\omega K_i = \Sigma_j K_{ij}$ |
| $A_{ij}$: | Link activation function or variable; $A_{ij} \in \{0, 1\}$, where $A_{ij} = 1$ if the respective link (i, j) is active during a contact window and zero otherwise; It should be noted that depending upon the optimum solution, during any particular contact window link (i, j) may be inactive and so, $A_{ij}$ may be zero during that window |

Analogously, for optimizing network and capacity assignment—for a particular (unknown) communications vector (x) over network, the objective function is a total cost function, F(x), that describes the total weighted network cost or utilization. Generally, there is no exact solution for F(x), which requires a specialized heuristic. However, when also driven to a limit (min or max) subject to network constraints, F(x) provides an optimal network configuration. Again the (also unknown) capacity of each link i may be represented as $a_i$, and the required volume for demand j may be represented as $b_j$. These constraints include: the total link load ($g_i \le a_i$, i=1, 2, ..., m); the allocation of flow responsive to demand ($h_j=b_j$, j=1, 2, ..., n); $x \in X \cup \{a_i/i=1, 2, ..., m\}$=set of feasible solutions; and F:X→R=Real Numbers.

To optimize for residual capacity of the entire network, the objective function is directly dependent upon residual link capacity ($C_{ij}-F_{ij}$) of all links with respect to transport cost and the residual buffer capacity ($b_i-K_i$) of all nodes with respect to buffer cost. In this approach, the objective function formulated in 248 is optimized according to Maximize$\{\Sigma_{N(\omega ij) \in W} \Sigma_{(i,j) \in N(\omega ij)} A_{ij} B_{ij}(C_{ij}-F_{ij}) + \Sigma_{C(W)} \Sigma_i \text{buff}_i(b_i-K_i)\}$.

To optimize for utilization of the most bottlenecked link and buffer, the objective function formulated in 248 is optimized according to (Maximize)$_{N(\omega ij) \in W} Y = \{\text{Min}_{(i,j) \in N(\omega ij)} A_{ij} B_{ij}(C_{ij}-F_{ij}) + \text{Min}_{i \in (W)} \text{buff}_i(b_i-K_i)\}$.

Similarly, to optimize for average residual capacities minimizes the average network node/link utilization. Essentially, this optimization normalizes the factors considered in maximizing total residual capacity and the objective function formulated in 248 is optimized according to $$\text{Max}\left\{\frac{\Sigma_{N(\omega ij) \in W} \Sigma_{k \in N(\omega ij)} \Sigma_{i,j} A_{ij} B_{ij}(C_{ij}-F_{ij})}{\Sigma_W B_{ij} A_{ij} C_{ij}} + \frac{\Sigma_{C(W)} \Sigma_i \text{buff}_i(b_i-K_i)}{\Sigma_{CW} \text{buff}_i b_i}\right\}$$

When optimization is based on known link and node capacities, MILP in step 250 is subject to a number of constraints over each sub-window. First, there must be link traffic during the selected window, i.e., $^\omega X^{nm}{}_{ij} \geq 0$. Optimization is constrained by the ratio of total carried communications (on node i and link i,j) to stored traffic, i.e., $^\omega F_{ij} = \Sigma_m \Sigma_n {}^\omega X^{nm}{}_{ij}$ and $^\omega K_i = \Sigma_j \Sigma_m \Sigma_n {}^\omega K_{ij}$.

The traffic cannot exceed the link capacity, i.e., $^\omega F_{ij} \geq {}^\omega C_{ij}$. During waiting periods, traffic intended for storage at a node cannot exceed node storage capacity, i.e., $^\omega K_i = \Sigma_{j(m,n)} {}^\omega K_{ij} \leq b_i$.

Similarly, total excess node traffic (incoming-outgoing) demand cannot exceed node storage capacity, i.e., $\Sigma_{m,n} \{\Sigma_j {}^\omega X_{ji} - \Sigma_j {}^\omega X_{ij}\} \leq b_i$.

Also, the excess node traffic demand is the net buffer occupancy, i.e., $\{\Sigma_j {}^\omega X_{ij} - \Sigma_j {}^\omega X_{ij}\} = [{}^\omega K^{nm}{}_j - {}^{(\omega-1)} K^{nm}{}_j]$, where (ω−1) indicates data in the buffer from the prior window. For optimum network performance, the network must establish a principle of flow conservation, such that for intervening nodes (between n and m) total flow in equals total flow out i.e., $$\left\{\sum_{j,\omega}({}^\omega X_{ij}^{nm}) - \sum_j({}^\omega X_{ij}^{nm})\right\}_{PlanningHorizon} = \begin{cases} M_{nm}, \text{ if } (i=m) \\ M_{nm}, \text{ if } (i=n) \\ 0, \text{ Otherwise} \end{cases}.$$

Each node is constrained by its allowed maximum number of links, i.e., $\Sigma_{(i,j) \in N(\omega ij)} A_{ij} \leq \alpha_i$. Finally, at the beginning of the initial window ($\omega_{0i}$), only nodes n originating traffic have an occupied buffer of $^{\omega 0i} M_{nm}$, i.e., $$^{\omega 0i} K_i^{nm} = \Sigma_j ({}^\omega X_{ij}^{nm}) = \begin{cases} M_{nm}, \text{ if } (i=n) \\ 0, \text{ Otherwise} \end{cases}.$$

When link and node capacities are unknown, or at least not pre-selected, optimization is no longer linear and so, cannot be treated as a MILP problem.

Figure 6:
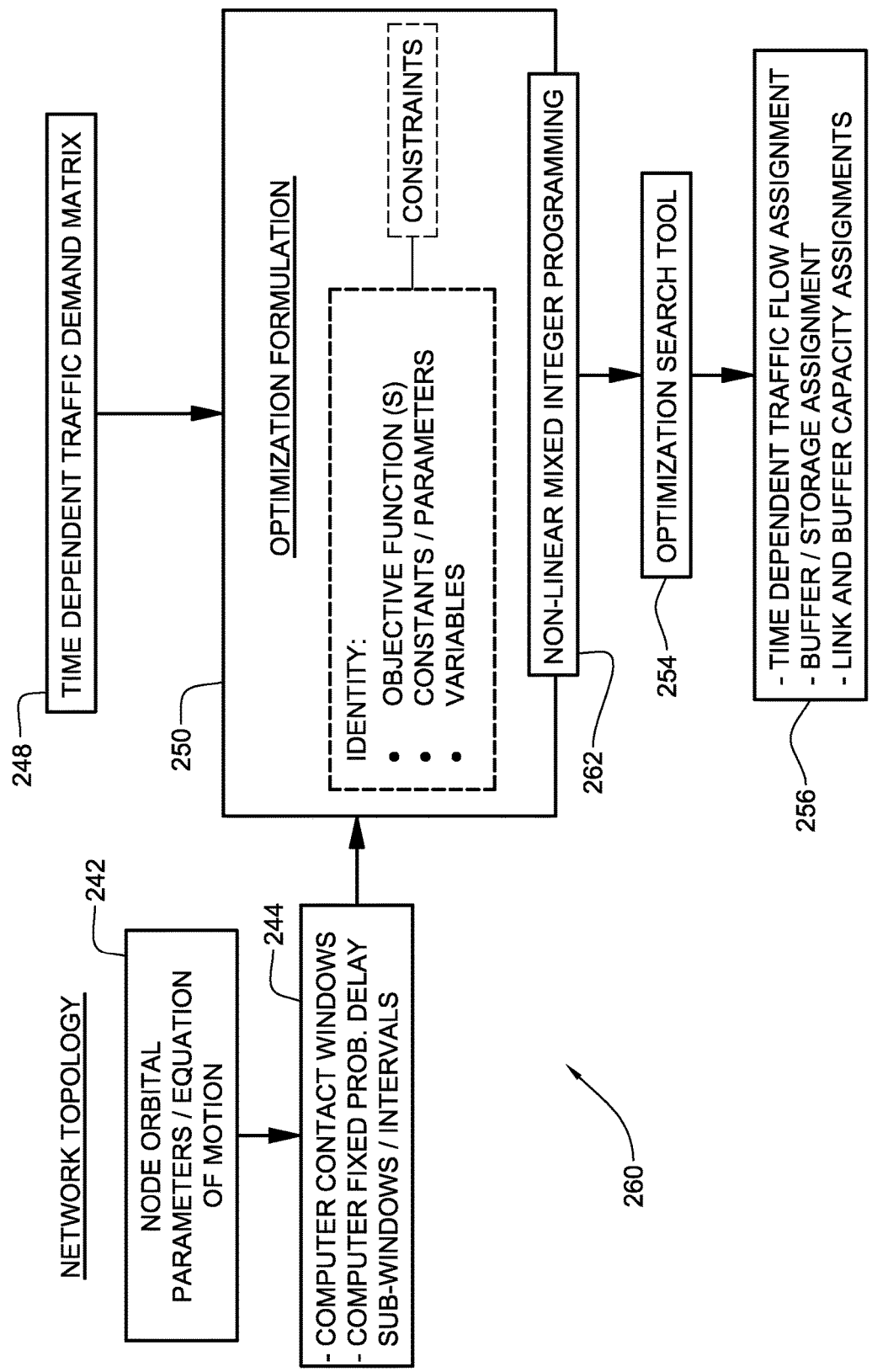
FIG. 6 shows an example in more detail of performance optimization of the operational network.

Instead, as shown in the example of FIG. 6 (with like elements labeled identically), when link and node capacities are unknown, design and capacity assignment 260 optimization is done using non-linear mixed integer programming 262. In particular, while capacity assignment optimization 260 is substantially similar to the operational network performance optimization 240 example of FIG. 5, using non-linear mixed integer programming 262. Again, network topology is defined by providing node orbital parameters 242, including a description of the motion of each node (e.g., as an equation). The node orbital parameters 242 are provided to describe network communications 244. The network communications description 244 and a traffic demand matrix 248 (forecast or measured) are passed to optimization formulation 250. Optimization formulation 250 collects network variables, parameters, constants and constraints to generate network specific optimization objective functions using non-linear mixed integer programming 262. The results are passed to a suitable optimization search tool 254. Again the optimization search tool 254 provides network capacity assignments 256 that may include, for example, time dependent traffic flow, node buffer/storage capacity and link and buffer capacity.

Optimization, however, is type of a non-linear constraint optimization problem with optimization input parameters (summarized in Table 3) that do not include node storage (buffer) capacities or link capacities to neighboring nodes.

TABLE 3

| Optimization Input Parameters (unknown capacities) | |
|---|---|
| M(W) = [$M_{ij}$]: | Traffic requirements (or demand) matrix during the planning horizon, where $M_{ij}$ a the traffic requirements between nodes i, j {during an initial contact window}* |
| N($\omega_{ij}$): | Set of available links between node i and its neighbors during contact window $\omega_{ij}$ |
| $\alpha_i$: | Maximum number of active links between node i and its neighbors |
| $N_{ij}$: | Number of available links between node i and its neighbors during a contact window $\omega_{ij}$, i.e., $N_{ij}$ = Cardinal [N ($\omega_{ij}$)] |
| $B_{ij}$: | Cost of transporting a data unit (e.g. a single bit) through node i (or link (i, j) ∈ N($\omega_{ij}$)). This is a time dependent cost that includes the associated propagation delay cost between nodes i, j, $B_{ij} = S_{ij} + d_{ij}$. |
| buff$_i$: | Storage cost of storing a datum at node i |

Correspondingly, output parametric variables (summarized in Table 4) include node storage (buffer) capacities or link capacities to neighboring nodes.

TABLE 4

Optimization Output Variables (unknown capacities)

$X^{nm}_{ij}$: Carried traffic on link i, j traveling end-to-end from source node n to destination node m
$F_{ij}$: Total traffic carried on link i, j over a contact window of opportunity
$K^{nm}_{ij}$: Carried traffic to be stored at node i traveling to node j traveling from source node n to destination node m, and stored during complement of contact window i.e., when no contact window available
$K^{nm}_{i}$: Total traffic stored at node i in a particular end-to-end path from node n to node m
$K_{ij}$: Total link (i, j) traffic stored at node i traveling to node j
$K_i$: Total carried traffic stored at node i; $K_i = \Sigma_j K_{ij}$
$C_{ij}$: Capacity of the link between neighboring pair (i, j); where (i, j) $\in N(\omega_{ij})$
$A_{ij}$: Link activation function or variable; $A_{ij} \in \{0, 1\}$, where $A_{ij} = 1$ if the respective link (i, j) is active during a contact window and zero otherwise.
$b_i$: The buffer size of node i.

Preferably, network topology 242, 244 and traffic demand matrix 248 are pre-selected. Also, potential links and associated communications link costs between node pairs are also pre-selected. Then, optimization is a trade-off of interdependent assignments, capacity assignment and flow assignment. Preferably, capacities are assigned to each link and node buffer to minimize the total network cost subject to delay constraints for a given network topology and given link flows. Also, preferably, optimal static routes are assigned for optimal flow. Primarily, an optimal flow assignment minimizes average path delay while meeting the traffic demands for given topology and link, buffer (storage) capacities.

For example, inadequate storage at a node with numerous antenna and links to numerous other nodes in a given path may require connected nodes to cache data locally, creating a bottleneck that slows traffic in that path well beyond traffic following other paths. Another, second node with excess capacity but few antennas and links to a few other nodes may experience significantly lighter traffic with only partially utilized storage. Removing antennas from the first node may divert traffic from the first path to the others for a steadier flow. Adding antennas to the second node may increase data flow through that node, alleviating the load on other nodes in other paths.

So, since capacity assignment and flow assignment are interdependent, it may be impossible to arrive at an optimal solution using classical optimization methods that no longer lend themselves to (Integer) LP. For an optimum design, total storage and link capacity may be minimized, while satisfying network demand within network constraints according to Minimize$\{\Sigma_{N(\omega ij)\in W}\Sigma_{(i,j)\in N(\omega ij)}A_{ij}B_{ij}C_{ij}+\Sigma_{C(W)}\Sigma_i \text{buff}_i b_i\}$.

Buffer and link capacity constrained by modeling each link as a M/M/1 queue with an arrival rate that is the total arriving flows in a modified Kleinrock Independence Approximation. See, e.g., M. Gerla, L. Kleinrock "On the Topological Design of Distributed Computer Networks," *IEEE Transactions on Comm.*, Vol. COM-25, January 1977. The average delay from link capacity is given by $$T_c = \frac{1}{\eta}\sum_{i,j}\frac{F_{ij}}{A_{ij}C_{ij}-F_{ij}}, \text{ where } \eta = \sum_{i,j}F_{ij}.$$

Similarly, each buffer is modeled as a M/M/1 queue with an arrival rate that is the total flow needed to be stored. The average delay due to buffer storage is given by $$T_b = \frac{1}{\gamma}\sum_j \frac{K_j}{b_j - K_j}, \text{ where } \gamma = \sum_j K_j.$$

As a result, in this non-linear optimization, the constraint that traffic cannot exceed the link capacity ($^\omega F_{ij} \geq ^\omega C_{ij}$) is replaced by the modified Kleinrock link capacity constraint, i.e., $$T_c = \frac{1}{\eta}\sum_{i,j}\frac{F_{ij}}{A_{ij}C_{ij}-F_{ij}} \leq T^c_{max}.$$

Similarly, the constraint that total excess node traffic demand cannot exceed node storage capacity $(\Sigma_{m,n}\{\Sigma_j^\omega X_{ji}-\Sigma_j^\omega X_{ij}\}\leq b_i)$ is replaced by the modified Kleinrock link capacity constraint $$T_b = \frac{1}{\gamma}\sum_j \frac{K_j}{b_j - K_j} \leq T^b_{max}.$$

Otherwise, as with MILP in step 250 of FIG. 5, over each sub-window optimization using non-linear mixed integer programming 262 is subject to a number of the same constraints. Again, there must be link traffic during the selected window, i.e., $^\omega X^{nm}_{ij}\geq 0$. Optimization is constrained by the ratio of total carried communications (on node i and link i,j) to stored traffic, i.e., $^\omega F_{ij}=\Sigma_m\Sigma_n {}^\omega X^{nm}_{ij}$ and $^\omega K_i = \Sigma_j \Sigma_m \Sigma n^\omega K_{ij}$.

The total excess node traffic (incoming-outgoing) demand cannot exceed node storage capacity, i.e., $\Sigma_{m,n}\{\Sigma_j^\omega X_{ji}-\Sigma_j^\omega X_{ij}\}\leq b_i$.

Also, the excess node traffic demand is the net buffer occupancy, i.e., $\{\Sigma_j^\omega X_{ji}-\Sigma_j^\omega X_{ij}\}=[^\omega K^{nm}_j - {}^{(\omega-1)}K^{nm}_j]$, where ($\omega-1$) indicates data in the buffer from the prior window. For optimum network performance, the network must establish a principle of flow conservation, such that for intervening nodes (between n and m) total flow in equals total flow out i.e., $$\{\Sigma_{j,\omega}(^{\omega}X_{ij}^{nm}) - \Sigma_j(^{\omega}X_{ij}^{nm})\}_{PlanningHorizon} = \begin{cases} M_{nm}, \text{ if } (i=m) \\ M_{nm}, \text{ if } (i=n) \\ 0, \text{ Otherwise} \end{cases}.$$

Each node is constrained by its allowed maximum number of links, i.e., $\Sigma_{(i,j) \in N(\omega ij)} A_{ij} \leq \alpha_i$. Finally, at the beginning of the initial window ($\omega_{0i}$), only nodes n originating traffic have an occupied buffer of $^{\omega 0i}M_{nm}$, i.e., $$^{\omega 0i}K_i^{nm} = \Sigma_j(^{\omega}X_{ij}^{nm}) = \begin{cases} M_{nm}, \text{ if } (i=n) \\ 0, \text{ Otherwise} \end{cases}.$$

Suitable non-linear mixed integer programming 262 approaches include well known genetic algorithms and, preferably, simulated annealing (SA) 270. Typically, simulated annealing is governed by the probability of accepting new assignment values, i.e., when it becomes less likely to adopt a subsequent value probability decreases and the iterations end. The assignment may have the form of $P(\Delta\Omega) = e^{-\Delta\Omega/T}$, where the parameter T is the simulated temperature governing SA; during iteration T is decreased by rT; and r is the simulated cooling rate, $0 < r < 1$.

Figure 7:
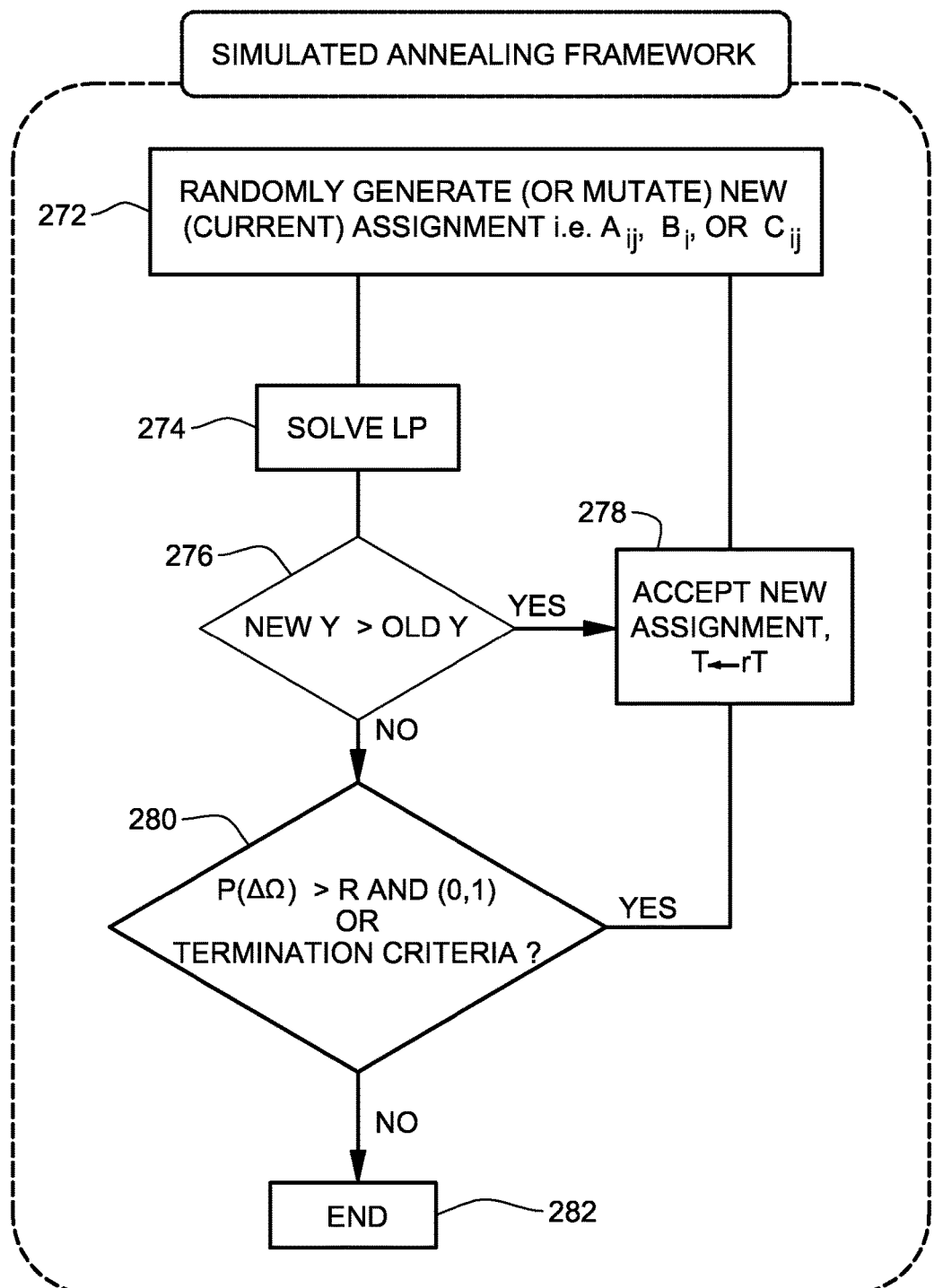
FIG. 7 shows an example of an optimization method through simulated annealing wherein initial solution values are generated in an initial linear programming iteration.

FIG. 7 shows an example of an optimization method through simulated annealing 270 wherein initial values generated in 272 in an initial iteration, are applied in linear programming 274 to generate a solution Y. e.g., to the objective function. Subsequent iterations, preferably, are performed by random in what is known as flip-flop transition, i.e., by randomly selecting two link assignments and exchanging them. In the following step the quality of objective function is evaluated for accepting or rejecting the new assignment, which repeats until an optimum solution is found or termination criteria are met.

For the first iteration, at least, the current value is altered (mutated) in 272 and a new solution Y is generated for the objective function. The new solutions is checked against the old in 276 and as long as the new value is larger than the old, in 278 the new value replaces the old and the temperature (T) is cooled. Returning to 272 the current value is mutated. However, when in 276 the new value is unchanged from, or smaller than, the old in 280 both the probability of finding a better solution is checked and, also, a check is made of whether termination criteria are met. If a better solution is still likely and before termination criteria are met, returning to 278 the new value replaces the old, the temperature (T) is cooled and in 272, the current value is mutated. Once in 280 it is likely that an optimum solution is found or termination criteria have been met, optimization is complete 282.

Advantageously, by optimizing an interplanetary network by design according to an advantageous embodiment, at least upon an initial network node placement, nodes are located for optimal connectivity throughout the network, to provide adequate local storage capacity and network bottlenecks do not drag down network performance. Nodes are equipped with sufficient (storage and communications) capacity to adequately meet expected network demands. Thus, by design the preferred network is performance balanced with each node having adequate storage capacity and a sufficient number of antennas to satisfy link communications capacity.

While the embodiments of the disclosure have has been described in terms of preferred embodiments, those skilled in the art will recognize that the embodiments can be practiced with modification within the spirit and scope of the appended claims. It is intended that all such variations and modifications fall within the scope of the appended claims. Examples and drawings are, accordingly, to be regarded as illustrative rather than restrictive.

We claim:

1. A method of optimizing a communications network, said method comprising:
    providing an initial network configuration for an interplanetary communications network, said interplanetary communications network having a plurality (k) of nodes;
    providing forecasts of traffic demand in said interplanetary communications network;
    determining objective functions by a computer responsive to said demands and characterizing communications over links between said nodes in said network;
    determining by said computer at least one limit for each said objective function;
    adjusting said initial network configuration, and thereby producing an adjusted network configuration, responsive to said at least one limit for each said objective function; and
    deploying said interplanetary communications network with said adjusted network configuration.

2. A method as in claim 1, wherein the provided initial network configuration includes a network topology description, routing metrics and expected network utilization.

3. A method as in claim 2, wherein the routing metrics include specific link capacities and a time varying link description (W(t)).

4. A method as in claim 2, wherein the expected network utilization includes link and node demand forecasts.

5. A method as in claim 2, wherein during the step of determining objective functions said computer generates a routing model defining communications routes between nodes and end to end in said network.

6. A method as in claim 5, wherein said computer applies weights to links in defined said communications routes.

7. A method as in claim 6, wherein after determining objective function limits, the method further comprises the step:
    returning to determining objective functions, said computer returning traffic demands results from said routing model, and further providing said objective functions responsive to said traffic demands results.

8. A method as in claim 1, where adjusting said initial network configuration comprises changing storage capacity on at least one node.

9. A method as in claim 1, where adjusting said initial network configuration comprises changing the number of antennas on at least one node.

10. A method as in claim 1, wherein the determined objective function limits are selected from the group consisting of residual link and buffer capacity, average residual link and buffer capacity, and utilization of a most bottlenecked link and buffer capacity.

11. A method as in claim 1 further comprising, after said interplanetary communications network is deployed, adding one or more nodes to said interplanetary communications network or removing one or more of the plurality of nodes of said interplanetary communications network.

12. A method of designing an optimized communications network, said method comprising:
   providing to a computer an initial network topology for an interplanetary communications network;
   defining network communications indicating time varying communications links between network nodes;
   providing a traffic demand matrix indicating communications requirements between network nodes;
   determining objective functions for said interplanetary communications network by said computer responsive to defined said network communications and said traffic demand matrix;
   driving each objective function to a selected limit by said computer, said objective function at said selected limit being identified as indicating an optimum interplanetary communications network configuration;
   adjusting an initial network configuration, and thereby producing an adjusted network configuration, responsive to said objective function at said selected limit; and
   deploying said interplanetary communications network with said adjusted network configuration.

13. A method as in claim 12, wherein the provided initial network topology includes node orbital parameters and a description of node motion.

14. A method as in claim 12, wherein defining network communications comprises:
   determining contact windows in said time varying communications links between said nodes, contact windows being described in a window matrix (W); and
   determining sub-windows in ones of said contact windows.

15. A method as in claim 12, wherein determining objective functions comprises:
   determining objective function parameters; determining objective function variables; and
   determining objective function constraints.

16. A method as in claim 15, wherein for each node i, the objective function parameters comprise:
   a traffic demand matrix (M(W)) during contact windows (W);
   a set ($N(\omega_{ij})$) of available links to neighboring nodes j during a contact window ($\omega_{ij}$);
   a maximum number of active links ($\alpha_{ij}$);
   a number ($N_{ij}$) of available links during a contact window ($\omega_{ij}$);
   a data transport cost ($B_{ij}$) through said node i to said neighboring nodes j; and
   a buffer storage cost ($buff_i$) for storing data.

17. A method as in claim 16, wherein the objective function variables comprise:
   an end-to-end link traffic load ($X^{nm}_{ij}$);
   a total link traffic load ($F_{ij}$);
   a node traffic ($K^{nm}_{ij}$) from end-to-end link traffic;
   a total node traffic ($X^{nm}_i$) stored at said node i from end-to-end link traffic;
   a total link stored node traffic ($K_{ij}$);
   a total stored node traffic ($K_i$); and
   a link activation ($A_{ij}$) function indicating active links.

18. A method as in claim 17, wherein the objective function parameters further comprise:
   a set of contact windows (W);
   a set of window complements (C(W));
   a link capacity to neighboring nodes j ($C_{ij}$); and
   a node buffer storage size ($b_i$).

19. A method as in claim 18, wherein the objective function constraints comprise:
   a total link load ($g_j$), where for link load $a_{ij}$, $g_i \leq a_{ij}$;
   a demand responsive flow allocation to neighboring node j ($h_j$), where $h_j = j$; and
   a set of feasible solutions ($x \in X$) to the objective function ($f(x)$).

20. A method as in claim 19, wherein the objective function constraints are linear and driving each objective function to a selected limit comprises said computer applying linear programming.

21. A method as in claim 20, wherein said linear programming is mixed integer linear programming.

22. A method as in claim 19, wherein said computer driving each objective function to a selected limit optimizes the objective function for residual link and buffer capacity according to Maximize $$\{\Sigma_{N(\omega ij) \in W} \Sigma_{(i,j) \in N(i,j)} A_{ij} B_{ij} (C_{ij} - F_{ij}) + \Sigma_{C(W)} \Sigma_i \text{buff}_i (b_i - K_i)\}.$$

23. A method as in claim 19, wherein said computer driving each objective function to a selected limit optimizes the objective function for utilization of most bottlenecked link and buffer according to $$(\text{Maximize})_{N(\omega ij) \in W} Y = \{\text{Min}_{(i,j) \in N(\omega ij)} A_{ij} B_{ij} (C_{ij} - F_{ij}) + \text{Min}_{i \in (W)} \text{buff}_i (b_i - K_i)\}.$$

24. A method as in claim 19, wherein said computer driving each objective function to a selected limit optimizes the objective function for average residual link and buffer capacity according to $$\text{Max}\left\{\frac{\Sigma_{N(\omega ij) \in W} \Sigma_{k \in N(\omega ij)} \Sigma_{i,j} A_{ij} B_{ij} (C_{ij} - F_{ij})}{\Sigma_W B_{ij} A_{ij} C_{ij}} + \frac{\Sigma_{C(W)} \Sigma_i \text{buff}_i (b_i - K_i)}{\Sigma_{CW} \text{buff}_i b_i}\right\}.$$

25. A method as in claim 17, wherein W is an initial contact window and the objective function variables further comprises:
   a link capacity to neighboring nodes j ($C_{ij}$); and
   a node buffer size ($b_i$).

26. A method as in claim 25, wherein driving each objective function to a selected limit comprises pre-selecting a network topology, said traffic demand matrix, potential links between node pairs and associated communications link costs.

27. A method as in claim 26, wherein driving each objective function provides an optimal flow assignment minimizing average path delay while meeting the traffic demands for the pre-selected said network topology, link capacity, and buffer capacity.

28. A method as in claim 27, wherein the optimal flow assignment is optimized according to:

$$\text{Minimize}\{\Sigma_{N(\omega ij) \in W} \Sigma_{(i,j) \in N(\omega ij)} A_{ij} B_{ij} C_{ij} + \Sigma_{C(W)} \Sigma_i \text{buff}_i b_i\}.$$

29. A method as in claim 25, wherein driving each objective function to a selected limit comprises applying simulated annealing (SA).

30. A method as in claim 12, wherein adjusting said initial network configuration comprises:
   determining a time dependent network traffic flow assignment;
   adjusting node buffer and storage assignments; and
   adjusting node link activation assignments.

31. A method as in claim 30, where adjusting said node buffer and storage assignments comprises changing storage capacity on at least one node.

32. A method as in claim 30, where adjusting said node link activation assignments comprises changing the number of antennas on at least one node.

33. A method of designing an optimized communications network, said method comprising the steps of:
providing an initial network topology for an interplanetary communications network;
defining network communications indicating time varying communications links between network nodes;
providing a traffic demand matrix indicating communications requirements between network nodes;
determining objective functions for said interplanetary communications network responsive to defined said network communications and said traffic demand matrix, wherein determining objective functions comprises the steps of:
determining objective function parameters,
determining objective function variables comprising:
a total link traffic load ($F_{ij}$);
a total stored node traffic ($K_i$);
a link activation ($A_{ij}$) function indicating active links;
a link capacity to neighboring nodes j ($C_{ij}$); and
a node buffer size ($b_j$), and
determining objective function constraints, wherein the objective function constraints comprise:
an average delay from link capacity having the form $$T_c = \frac{1}{\eta}\sum_{i,j} \frac{F_{ij}}{A_{ij}C_{ij} - F_{ij}}, \text{ where } \eta = \sum_{i,j} F_{ij}; \text{ and}$$

an average delay due to buffer storage having the form $$T_b = \frac{1}{\gamma}\sum_{j} \frac{K_j}{b_j - K_j}, \text{ where } \gamma = \sum_{j} K_j.$$

driving each objective function to a selected limit, said objective function at said selected limit being identified as indicating an optimum interplanetary communications network configuration;
adjusting an initial network configuration, and thereby producing an adjusted network configuration, responsive to said objective function at said selected limit; and
deploying said interplanetary communications network with said adjusted network configuration.

* * * * *